United States Patent
Weksler et al.

(10) Patent No.: US 9,955,412 B2
(45) Date of Patent: Apr. 24, 2018

(54) SELECTING A NETWORK

(71) Applicant: LENOVO (Singapore) PTE, LTD., New Tech Park (SG)

(72) Inventors: Arnold S. Weksler, Raleigh, NC (US); John Carl Mese, Cary, NC (US); Nathan J. Peterson, Durham, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 297 days.

(21) Appl. No.: 14/337,071

(22) Filed: Jul. 21, 2014

(65) Prior Publication Data

US 2016/0021604 A1    Jan. 21, 2016

(51) Int. Cl.
*H04W 4/00* (2009.01)
*H04W 48/18* (2009.01)
*H04L 12/54* (2013.01)
*H04L 29/12* (2006.01)
*H04L 12/729* (2013.01)
*H04L 12/801* (2013.01)
*H04L 12/939* (2013.01)

(52) U.S. Cl.
CPC ......... *H04W 48/18* (2013.01); *H04L 12/5692* (2013.01); *H04L 45/125* (2013.01); *H04L 47/11* (2013.01); *H04L 49/555* (2013.01); *H04L 61/6077* (2013.01)

(58) Field of Classification Search
CPC ............................ H04W 48/18; G06F 15/173
See application file for complete search history.

(56) References Cited

U.S. PATENT DOCUMENTS

| | | | |
|---|---|---|---|
| 7,839,871 B2 | 11/2010 | Forssell et al. | |
| 8,223,729 B2 | 7/2012 | Raju et al. | |
| 8,848,608 B1* | 9/2014 | Addepalli | H04W 4/046 370/328 |
| 9,185,719 B2 | 11/2015 | Wietfeldt et al. | |
| 2004/0077341 A1* | 4/2004 | Chandranmenon | H04W 36/14 455/418 |
| 2005/0238046 A1 | 10/2005 | Hassan et al. | |
| 2011/0225284 A1* | 9/2011 | Savolainen | H04L 61/1511 709/223 |
| 2013/0078985 A1* | 3/2013 | Savolainen | H04L 29/12952 455/418 |
| 2014/0019873 A1* | 1/2014 | Gupta | G06F 9/4443 715/744 |
| 2014/0181964 A1* | 6/2014 | Park | G06F 21/6209 726/19 |

(Continued)

FOREIGN PATENT DOCUMENTS

| | | |
|---|---|---|
| EP | 2057790 A2 | 5/2009 |
| EP | 2070361 A1 | 6/2009 |

(Continued)

*Primary Examiner* — Shukri Taha
(74) *Attorney, Agent, or Firm* — Kunzler, PC (57) ABSTRACT

For selecting a network, a method is disclosed that includes associating interface executable code with one or more network interfaces, selecting one of the network interfaces responsive to detecting network communication originating at the executable code, and directing the network communication to the selected network interface.

17 Claims, 10 Drawing Sheets

(56) References Cited

U.S. PATENT DOCUMENTS

| | | | |
|---|---|---|---|
| 2014/0281548 A1* | 9/2014 | Boyer | H04L 63/061 713/171 |
| 2015/0092673 A1* | 4/2015 | Singh | H04W 28/0215 370/329 |
| 2015/0121538 A1* | 4/2015 | Hsu | G06F 21/53 726/26 |
| 2015/0319144 A1* | 11/2015 | Barton | H04L 63/0428 713/168 |

FOREIGN PATENT DOCUMENTS

| | | |
|---|---|---|
| EP | 2468047 A1 | 6/2012 |
| JP | 2006121192 A | 11/2006 |
| JP | 2009544262 A | 12/2009 |
| JP | 2010503251 A | 1/2010 |
| JP | 2013502844 A | 1/2013 |
| WO | 2004/008793 A1 | 1/2004 |
| WO | 2007/127323 A2 | 11/2007 |

* cited by examiner

|  | Financial | Entertainment |
|---|---|---|
| Allowed Networks and Priority | Network B<br>Network D | Network A<br>Network C<br>Network D |
| Applications | QuickBooks<br>Accounting App | Internet Browser<br>Music Player |

SELECTING A NETWORK

BACKGROUND

Field

The subject matter disclosed herein relates to computer networking and more particularly relates to selecting a network.

Description of the Related Art

As technology continues to advance, computing devices may perform a wide variety of different tasks in different scenarios. As computing devices decrease in size, they may travel more with their respective users. As computing devices move with their respective users, the computing devices may come in and out of contact with a wide variety of different networks.

In some scenarios, a computing device may automatically connect with certain recognized networks. A computing device may be configured to generally prefer one network over another. In response to a preferred network becoming available, the computing device may switch to the preferred network. The preferences may be set by a user of the computing device.

In some examples, a computing device may switch to a network based on availability of a network. For example, a mobile device may be configured to use a local network when it is available and to use a broadband network when the local network is not available.

In certain examples, network preferences and settings may be set at an operating system level for the computing device. In one example, a mobile device may be configured to prefer a local network when it is available because the local network may be faster than a broadband network. However, the local network may be a public network and the user may unknowingly transmit private information on the public network. Therefore, a user may have to decide between network performance and network security. Because certain networks may be preferred for a wide variety of specific reasons, currently selection technologies may be ineffective in selecting an appropriate network.

BRIEF SUMMARY

An apparatus for selecting a network is disclosed. In one embodiment, the apparatus includes a processor and a memory that stores machine instructions executable by the processor. In one embodiment, the code may associate executable code with one or more network interfaces. In another embodiment, the code may select one of the network interfaces responsive to detecting network communication originating at the executable code. In a further embodiment, the code may direct the network communication to the selected network interface. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
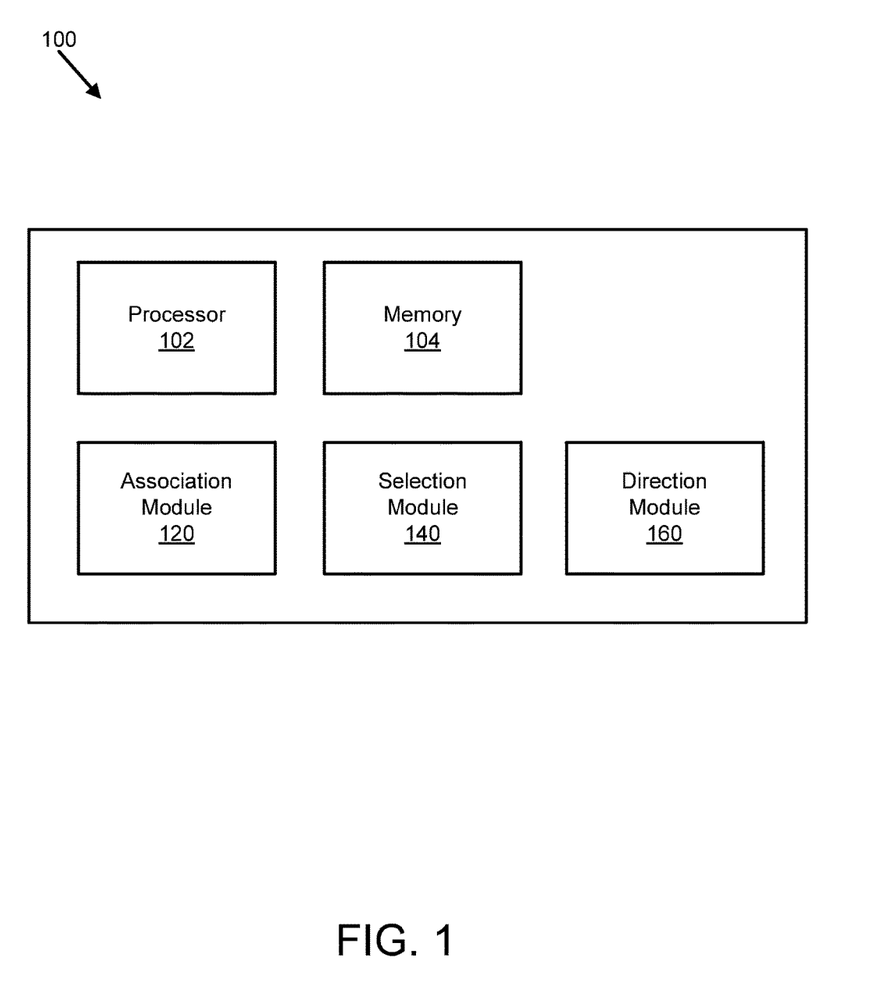
FIG. 1 is a schematic block diagram illustrating one embodiment of an apparatus for selecting a network.

FIG. 1 is a schematic block diagram illustrating one embodiment of an apparatus for selecting a network. In one embodiment, the apparatus 100 includes a processor 102 and a memory 104 that stores code executable by the processor 102. The processor 102 may be any processor capable of executing executable code as one skilled in the art may appreciate. The memory 104 may be any memory storage device that is capable of storing executable code as one skilled in the art may appreciate. The memory 104 may be volatile, non-volatile, solid state, magnetic, optical, or other, or the like.

In one embodiment, the code may include an association module 120 that associates interface executable code with one or more network interfaces. The code may be any form of executable code as one skilled in the art may appreciate. In certain embodiments, the executable code may include a driver, an operating system, a library, an application, or other, or the like as one skilled in the art may appreciate.

In one example, a local area network may include many routers with varying capabilities. Respective routers may be different network interfaces although they may be included in one network. For example, one router may be faster than other routers, and the association module 120 may associate the executable code with the faster router. In another example, one router may have a higher signal strength than other routers on the network and the association module 120 may associate a router with the executable code.

In another example, one router may perform faster but have a higher signal strength while another router may perform slower but more reliably than the faster router. The association module 120 may associate one portion of executable code with the faster router, and another portion of executable code with the more reliable router.

The association module 120 may associate one or more portions of executable code with one or more network interfaces based on user preference, a priority value, a category, or other, or the like.

For example, executable code may require higher performance but may tolerate occasional errors. In this example, the association module 120 may associate the executable code with the faster router that may be less reliable. Another executable code may require higher reliability, but may tolerate slower speeds. The association module 120 may associate this executable code with the slower router that may include a higher signal strength or that may perform more reliably. Of course, the apparatus 100 may execute both portions of executable code at similar times as will be described in later embodiments.

In certain embodiments, the association module 120 may associate executable code with a network interface in response to an indication by a user. The apparatus 100 may present a user interface to a user and may receive responses, settings, configuration parameters, or the like, that may indicate desired associations between various portions of executable code and one or more network interfaces.

In another embodiment, the association module 120 may associate executable code with one or more network interfaces in response to an indication from a user. For example, a user interface for the apparatus 100 may include options for a user to indicate one or more network interfaces. For example, the user interface may present a list of applications that may operate at the apparatus 100, and a list of network interfaces that may have been available to the apparatus 100. The association module 120 may receive one or more indications from the user and may associate portions of executable code with one or more network interfaces based on the indication from the user.

In another embodiment, the association module 120 may associate an application based, at least in part, on the application being a member of a category. For example, a user may define one or more categories of applications at the apparatus 100. For example, categories may include, but are not limited to, entertainment applications, music applications, storage applications, financial application, social applications, operating system code, driver code, libraries, or other, or the like. A user may install an application that may be a financial application and the association module 120 may associate the installed financial application with a network interface that may be associated with the category of financial applications. Therefore, in certain embodiments, the association module 120 may automatically associate the financial application with a network interface based on the category and without user intervention.

In another embodiment, the apparatus may include a selection module 140. In certain embodiments, the settings module 140 may include code that selects one of the network interfaces responsive to detecting network communication originating at the portion of executable code.

In one embodiment, an application operating at the apparatus 100 may request a network connection with a remote server. Based on the association module 120 having associated the application with an available network interface, the selection module 140 may select an available (and associated) network interface in response to the application requesting the connection.

In one embodiment, in response to there being no associated network interfaces, the selection module 140 may fail to select a network interface although there may one or more network interfaces available for use.

In one example, the apparatus 100 may be within range of a public unsecured network. In response to a financial application requesting a connection with a remote server, the association module 120 may not have associated the financial and the selection module 140 may refuse the network connection request. Therefore, in certain examples, application that may be associated with the public unsecured network may communicate using the unsecured network, while other applications that may not be associated with the unsecured network may not communicate using the public unsecured network. Providing network availability at the application level may provide enhanced security by not allowing private information to be transmitted over an unknown network interface (or unassociated network).

In one example, a local area network may include an unsecured wireless router, and a secured wired router. The apparatus 100 may be connected to the local area network with both the unsecured wireless router and the secured wired router. Of course, the apparatus 100 may be configured to route traffic to one or the other router so as to maintain correct network operating procedures (i.e. not create any loopback problems on an Ethernet network, or similar).

In another embodiment, the selection module 140 may select the unsecured wireless router with an Internet browsing application and may select the secured wired router with a financial application. Therefore, the selection module 140 may select one or more network interfaces for one or more portions of executable code. In another example, the selection module 140 may select the unsecured wireless router for the operating system and may select the secured wired router for use only by the financial application. Of course, this disclosure is not limited in this regard as the selection module 140 may select one or more network interfaces in response to one or more network interfaces being available and associated with executable code operating at the apparatus 100.

The association module 120, in a further embodiment, may associate many distinct portions of executable code with one router of a local area network in response to no other routers being available. In other embodiments, the association module 120 may not associate the executable with any network interfaces in response to the portions of executable code not being associated with a network interface. Therefore, the apparatus 100, in certain examples, may not use a network interface although it may be within range and may be available.

In another embodiment, the associated network interfaces may be included in a prioritized list and the selection module 140 may select the network interface further based on a priority value.

In one embodiment, the associated network interfaces may be provided in a prioritized list. For example, the association module 120 may associate a first application and a second application with both a local area network interface and a broadband network interface. The association module 120 may include a priority value for the applications such that the first application may prefer the local area network over the broadband network while the second application may prefer the broadband network over the local area network.

In response to both network being available, the selection module 140 may select the local area network for the first application and may select the broadband network for the second application. In response to only the broadband network being available or only the local area network being available, the selection module 140 may select only the available network for both applications.

In another embodiment, interface executable code may indicate a preferred network interface. For example, an application executing at the apparatus 100 may indicate to only use a broadband network interface. The associate module 120 may associate the application with the broadband network and may disassociate the application with other networks. The selection module 140 may select the broadband network in response to the application requesting a connection with a remote server. Therefore, in certain embodiments, the selection module 140 may select one or more available network interfaces in response to an indication from the portion of executable code.

In one embodiment, the selection module 140 may switch a network interface for the apparatus 100 in response to interface executable code requesting a connection to a remote device. For example, a first application may be associated with a first network interface and may be communicating via the first network interface. The first application may not be associated with a second network interface. A user may initiate the second application and the second application may request a network connection to a remote device. The selection module 140 may select the second network interface for the second application and the second application may communicate with the remote device using the second network interface. In response to the apparatus 100 switching from the second application to the first application, the selection module 140 may accordingly select the first network interface. Therefore, in certain examples, the selection module 140 may dynamically switch between two or more network interfaces based of different portions of executable code, operating at the apparatus, requesting connections with one or more remote devices.

In another embodiment, the selection module 140 may request confirmation from a user of the apparatus 100 before switching from one network interface to another network interface. Furthermore, the selection module 140 may remember prior confirmations and may or may not request confirmations for remembered selections or indications by the user.

In another embodiment, the selection module 140 may select a network interface for executable code based, at least in part, on a destination for a network communication. For example, executable code may request to communicate with a first remote device and a second remote device. The association module 120 may have associated with executable code with both the first and the second remote devices.

In response to the executable code requesting communication with the first remote device the selection module 140 may select the first network interface. In response to the executable code requesting communication with the second remote device, the selection module 140 may select the second network interface.

In one embodiment, the apparatus 100 may include a direction module 160 that may direct network communication to a selected network interface. In certain embodiments, as the selection module 140 selects various network interfaces, the direction module 160 may direct network communications from respective portions of executable code to the selected network interfaces as described herein.

In one example, the association module 120 may associate a first application with a local area wireless network and a second application with a broadband network. As previously described, the selection module 140 may select a network interface based on one or more associations between portions of executable code and the selected network interfaces.

In one embodiment, the direction module 160 may direct communications from the first application to the local area wireless network and communications from the second application to the broadband network. Therefore, in certain examples, the direction module 160 may allow the apparatus 100 to communicate via two or more network interfaces concurrently as two or more portions of executable code communicate via their respective associated networks.

In one example, the apparatus 100 may include a Wi-Fi network, a secure Wi-Fi network, a wide area network, and a virtual private network. As indicated by the selection module 140, the direction module 160 may direct network communications from a social application to the Wi-Fi network, may direct network communications from a financial application to the secure Wi-Fi network, may direct web browsing network communications to the wide area network, and may direct confidential communications to the virtual private network. Therefore, the apparatus 100 may concurrently communicate with each of the four network interfaces, and respective communications from the various portions of code may be directed by the direction module 160 to their associated network interfaces as described herein.

Figure 2:
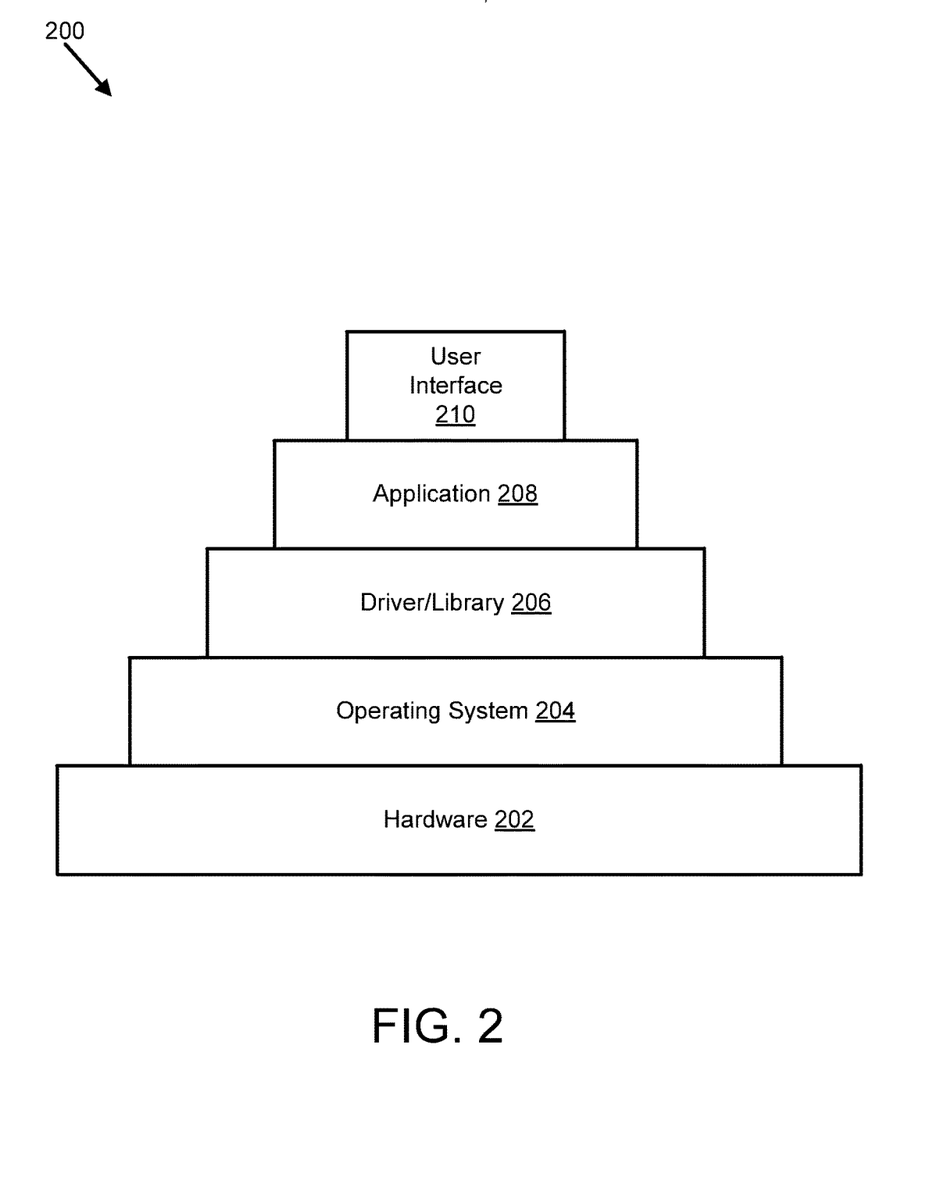
FIG. 2 is an illustration depicting examples of executable code according to one embodiment of the present disclosure.

FIG. 2 is an illustration depicting examples of executable code according to one embodiment of the present disclosure. In one embodiment, an apparatus 100 may include hardware 202, such as, but not limited to, a processor, memory, storage, network, display, communications, interfaces, input devices, output devices, or the like. An operating system 204 for the apparatus 100 may include, but is not limited to, Windows™, Linux, MacOS™, Unix, other Unix variants, other Linux variants, Windows variants, desktop operating systems, server operating systems, or other, or the like. Of course, this disclosure is not limited to any specific operating system.

The operating system 204 may include one or more portions of code and may operate various hardware 202 components of the apparatus 100. The operating system 204 may indicate to an application which network interface may be available. Therefore, the operating system 204 may restrict usage of one or more network interfaces. Interface executable code as described herein may include interface the operating system 204 for the apparatus 204.

The operating system 204 may include one or more drivers or libraries 206. Because a driver or library may be primarily responsible for network communications, the executable code may include a driver or library 206 as one skilled in the art may appreciate. Therefore, in certain embodiments, the direction module 160 may direct network communications from a driver 206 to a selected network interface.

The apparatus 100 may include an application. As described herein, interface executable code may include the application as one skilled in the art may appreciate. Therefore, the direction module 160 may direct communications from an application operating at the apparatus 100 to a selected network interface.

In one example, many applications 208 may be communicating with one or more remote devices and the direction module 160 may direct these communications from respective applications to their associated and selected network interfaces as described herein. Therefore, in certain embodiments, interface executable code as described herein may be selected from the group consisting of an application, an operating system, a driver, and a library, or other, or the like.

Figure 3:
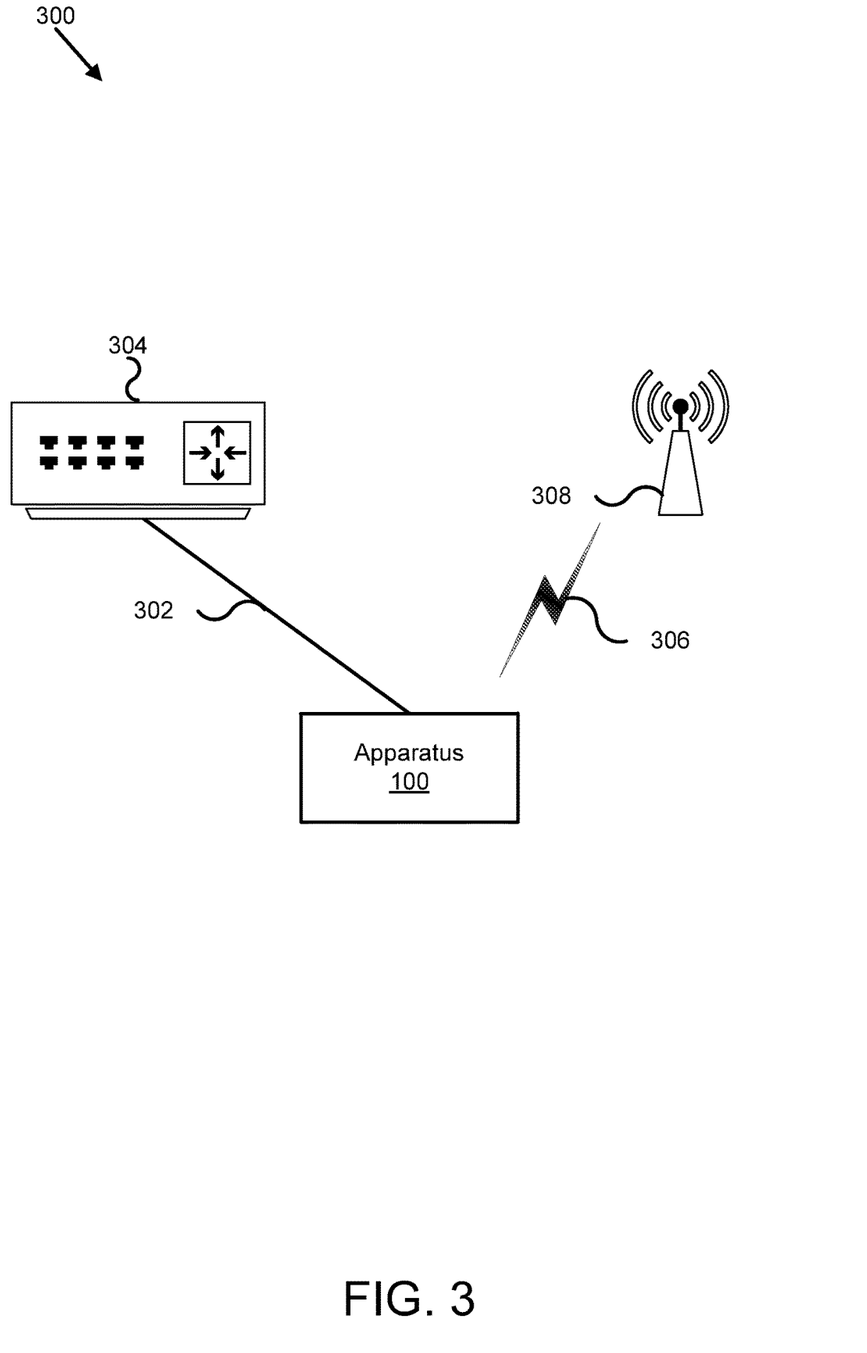
FIG. 3 is a diagram illustrating one embodiment of an apparatus for selecting a network in accordance with the present disclosure.

FIG. 3 is a diagram illustrating one embodiment of an apparatus for selecting a network in accordance with the present disclosure. In one embodiment, the apparatus 100 may include hardware 202 to communicate with a wired network 302 to a wired network router 304 and over a wireless network 306 to a wireless network router 308. The association module 120 may associate one or more portions of executable code with the wired network 302 and may associate other portions of executable code with wireless network 306.

The association module 120 may further associate applications executing on the apparatus 100 with either of the wired network 302 and/or the wireless network 306. The association module 120 may associate executable code with both the wired network 302 and the wireless network 306 and may include a priority value. In response to both the wired network 302 and the wireless network 306 being available to the apparatus 100, the selection module 140 may select one of the wired network 302 or the wireless network 306 based on the priority value as previously described.

In another embodiment, the association module 120 may dynamically alter associations between portions of executable code and network interfaces. For example, in response to the wireless network 306 coming in and out of range, the association module 120 may temporarily remove the association with the wireless network 306 until the wireless network is more consistently available. In another embodiment, the association module 120 may dynamically alter associations between portions of executable code and network interfaces in response to one or more of the network interfaces underperforming.

For example, where communications via the wired network 302 may be slower than expected, the association module 120 may associate the executable code with the wireless network 306. For example, the wired network may be busy or may suffer from a malfunction or other error. The association module 120 may receive a notification from the wired router 304 that it is experiencing difficulties. In response, the association module 120 may remove the association with the wired network interface 302 until the error condition of the wired router 304 is corrected.

Figure 4:
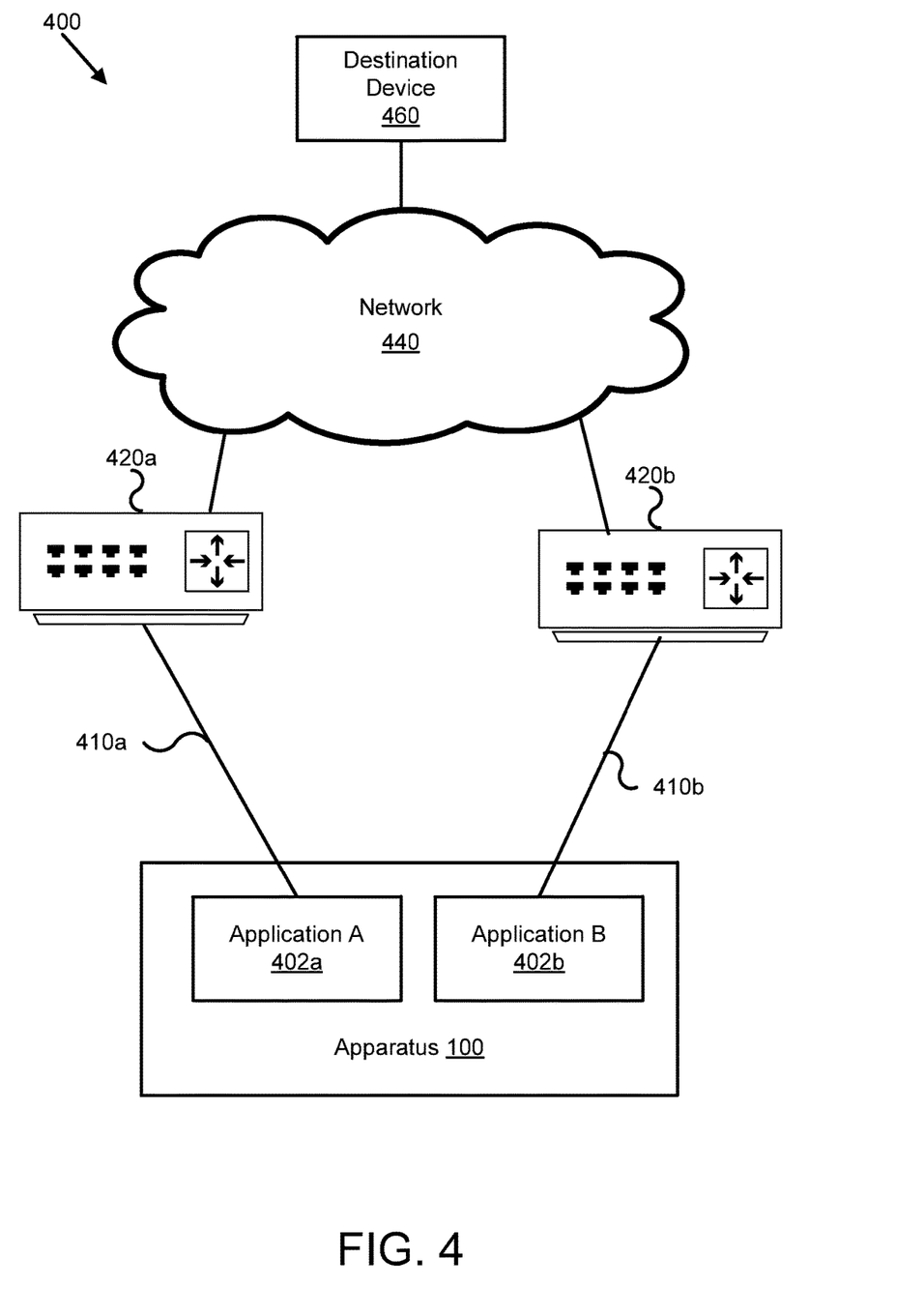
FIG. 4 is a diagram illustrating one embodiment of an apparatus for selecting a network in accordance with the present disclosure.

FIG. 4 is a diagram illustrating one embodiment of an apparatus for selecting a network in accordance with the present disclosure. In one embodiment, the apparatus 100 may include a first Application A 402a and a second Application B 402b concurrently operating at the apparatus 100. The association module 120 may associate the Application Interface code 402a with a network interface 410a and may association the Application B code 402b with a network interface 410b. Respective network interfaces 410 may be wired, wireless, or other, or the like, as one skilled in the art may appreciate.

Respective routers 420 may connect to a wide area network, such as, but not limited to, the Internet. A destination device 460 may be available for connections as one skilled in the art may appreciate.

In one example, Application A 402a may request a connection to the destination device 460. Because the association module 120 may have associated the network 410a with the Application A, the request may be transmitted via the 410a network interface. The destination device 460 may accept the connection and data may be transmitted between the Application A 402a and the destination device 460.

Furthermore, Application B 402b may request a connection to the destination device 460. Because the association module 120 may have associated the network 410b with the Application B, the request may be transmitted via the 410b network interface. The destination device 460 may accept the connection and data may be transmitted between the Application B 402b and the destination device 460.

Therefore, in certain embodiments, the Application A 402a and Application B 402b may concurrently communicate with the destination device 460 via separate connections and separate network interfaces 410. Because respective routers 420 may mask an Internet Protocol (IP) address for the apparatus 100 the destination device 460 may not be aware that both connections originated at the apparatus 100. The destination device 460 may only see the respective routers 420.

Figure 5:
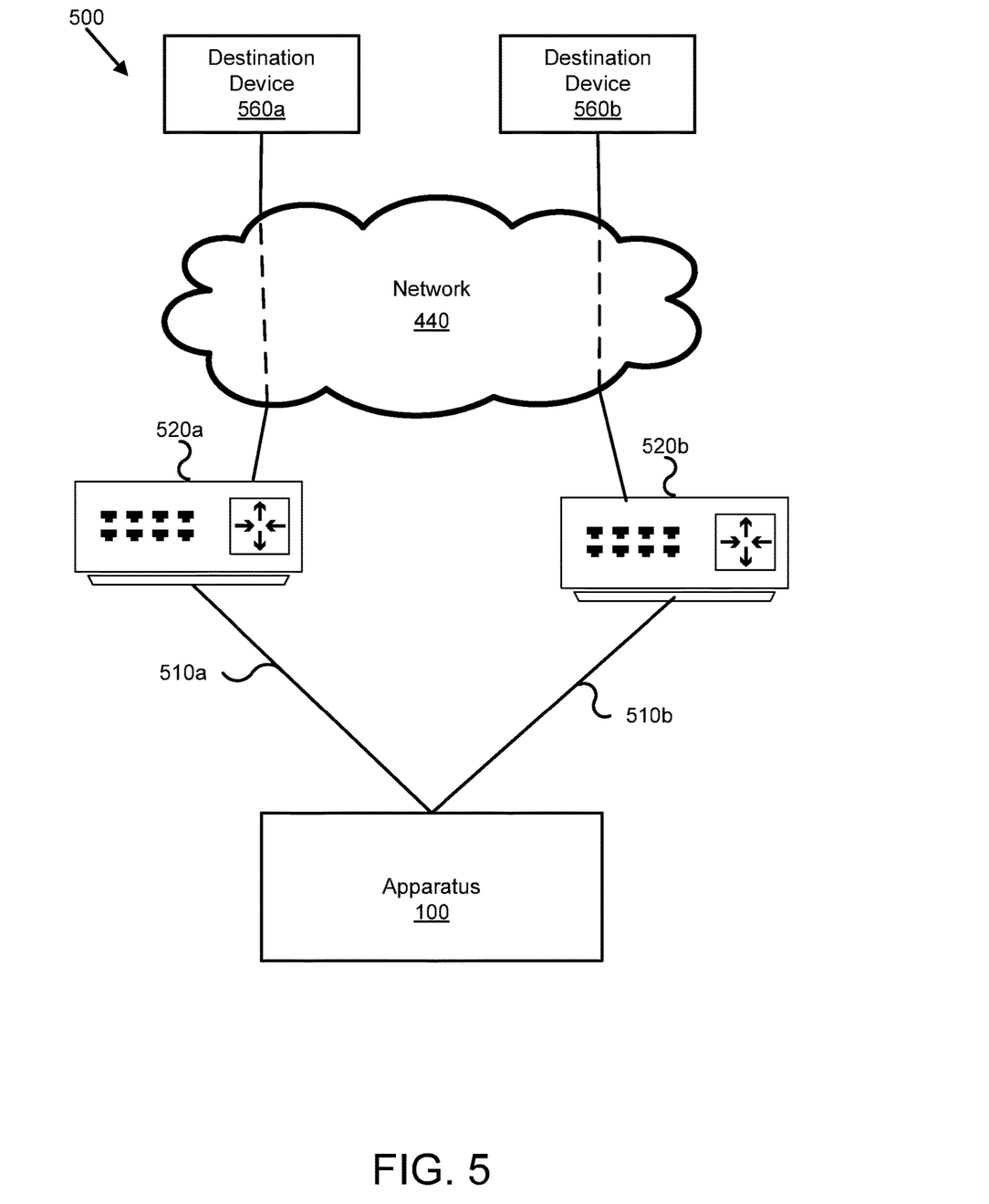
FIG. 5 is a diagram illustrating one embodiment of an apparatus for selecting a network in accordance with the present disclosure.

FIG. 5 is a diagram illustrating one embodiment of an apparatus for selecting a network in accordance with the present disclosure. In one embodiment, the apparatus 100 may include interface executable code. The association module 120 may associate the executable code with the network interface 510a and network interface 510b.

The executable code may request a connection to destination device 560a. Based on the destination device 560a, the selection module 140 may select the network interface 510a to transmit the connection request. This may be the case even if there may be another route to the destination device may exist through the network 440.

Furthermore, the executable code may request a connection to destination device 560b. Based on the destination device 560b, the selection module 140 may select the network interface 510b to transmit the connection request.

This may be the case even if there may be other routes to the destination device. Therefore, in certain embodiments, the selection module 140 may select a network interface based, at least in part, on the destination device.

Figure 6:
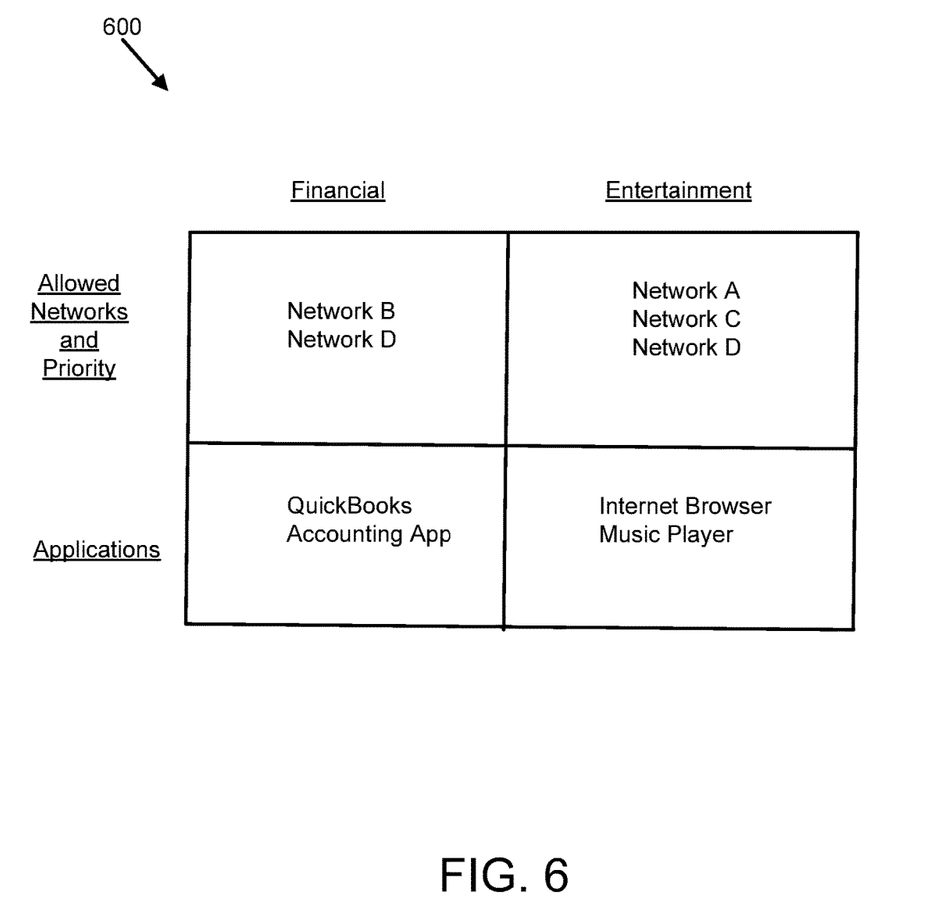
FIG. 6 is a diagram illustrating associations in accordance with one embodiment of the present disclosure.

FIG. 6 is a diagram illustrating associations in accordance with one embodiment of the present disclosure. In one embodiment, the association module 120 may associate one or more portions of executable code with one or more network interfaces based on a category or priority.

In one example, the association module 120 may include two categories in a table: financial and entertainment. The table may also include a row for allowed network and priority, and a row for applications. Allowed networks for the financial category of applications may be included in the table cell as indicated. Allowed network for the entertainment category may be included in the table cell as indicated. A second row in the table may include applications to be associated with the category.

The association module 120 may associate QuickBooks and an Accounting Application with network interfaces "Network B" and "Network D." The association module 120 may associate an Internet browser application and a music player application with network interfaces "Network A," "Network C," and "Network D."

Furthermore, an order of the network interfaces in the first row of the table may also indicate a priority. For example, the in Entertainment category the table may indicate networks A, C, and D in that order. Therefore, if network A is available, then entertainment categories will be routed through network A. If network A is not available, but network C is, then network communications will be directed through network C as previously described. If neither network A of network C are available, but network D is, then the direction module 160 may direct network communications through network interface D.

In one example, the association module 120 may add an application to the table entertainment column of the table. In response, the association module 120 may create associations between the added application and networks A, C, and D as indicated in the table. In another example, a user may indicate that a new network, network E is now available for financial applications. The association module 120 may add the network E to the table and the association module 120 may automatically update associations between the new network and the financial applications listed in the financial column of the table. Of course, one skilled in the art may appreciate other ways in which an array of associations may be maintained and this disclosure is not limited in this regard.

In another example, the table may include a column for "unknown" applications. In response to the user adding an application to the apparatus 100, the association module 120 may put an entry for the new application in the "unknown" category and may create appropriate associations based on the network interfaces associated with the "unknown" category. Of course, this disclosure is not limited in this regard and other names, categories, etc. may be used.

Figure 7:
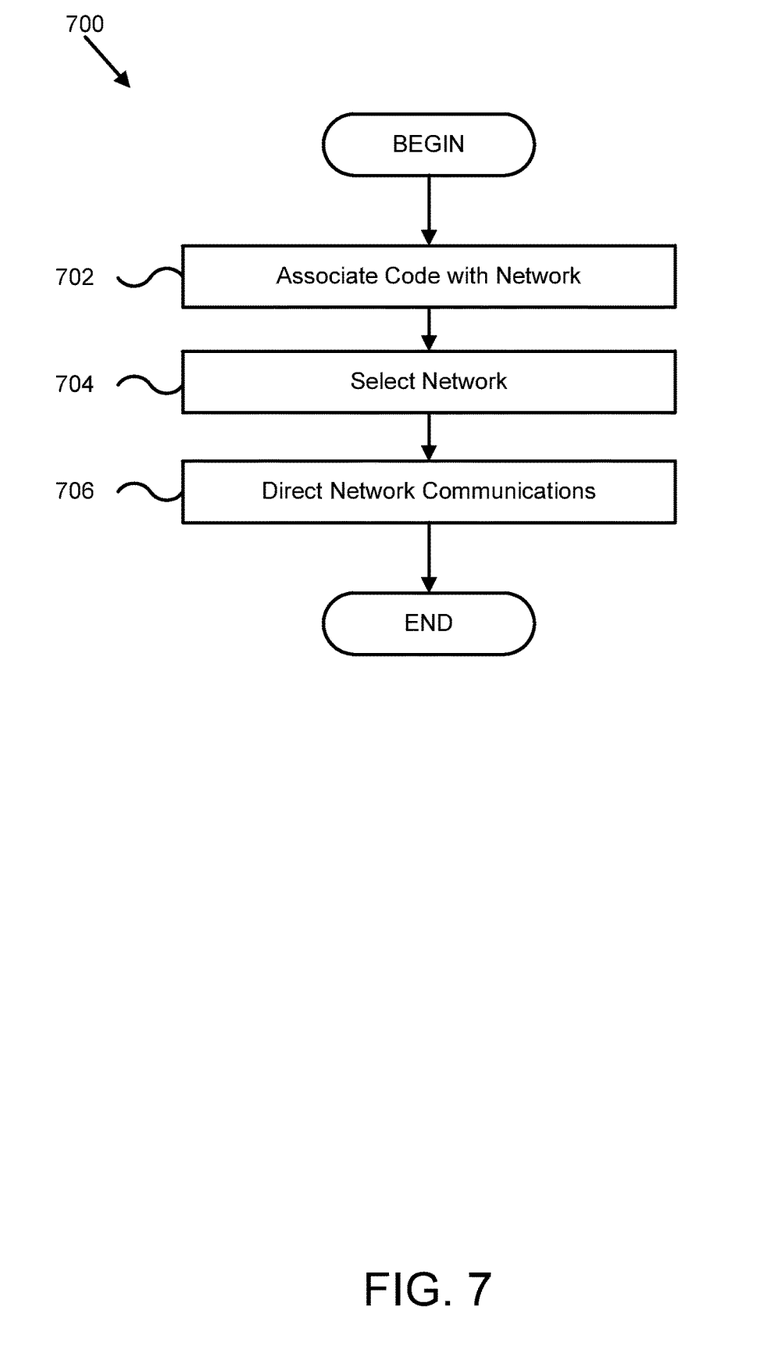
FIG. 7 is a schematic flow chart diagram illustrating one embodiment of a method for selecting a network.

FIG. 7 is a schematic flow chart diagram illustrating one embodiment of a method for selecting a network. In one embodiment, the method may begin and the association module 120 may associate 702 interface executable code with one or more network interfaces. The selection module 140 may select 704 one of the network interfaces responsive to detecting network communication originating at the executable code. The direction module 160 may direct 706 the network communication to the selected network interface and the method may end.

Figure 8:
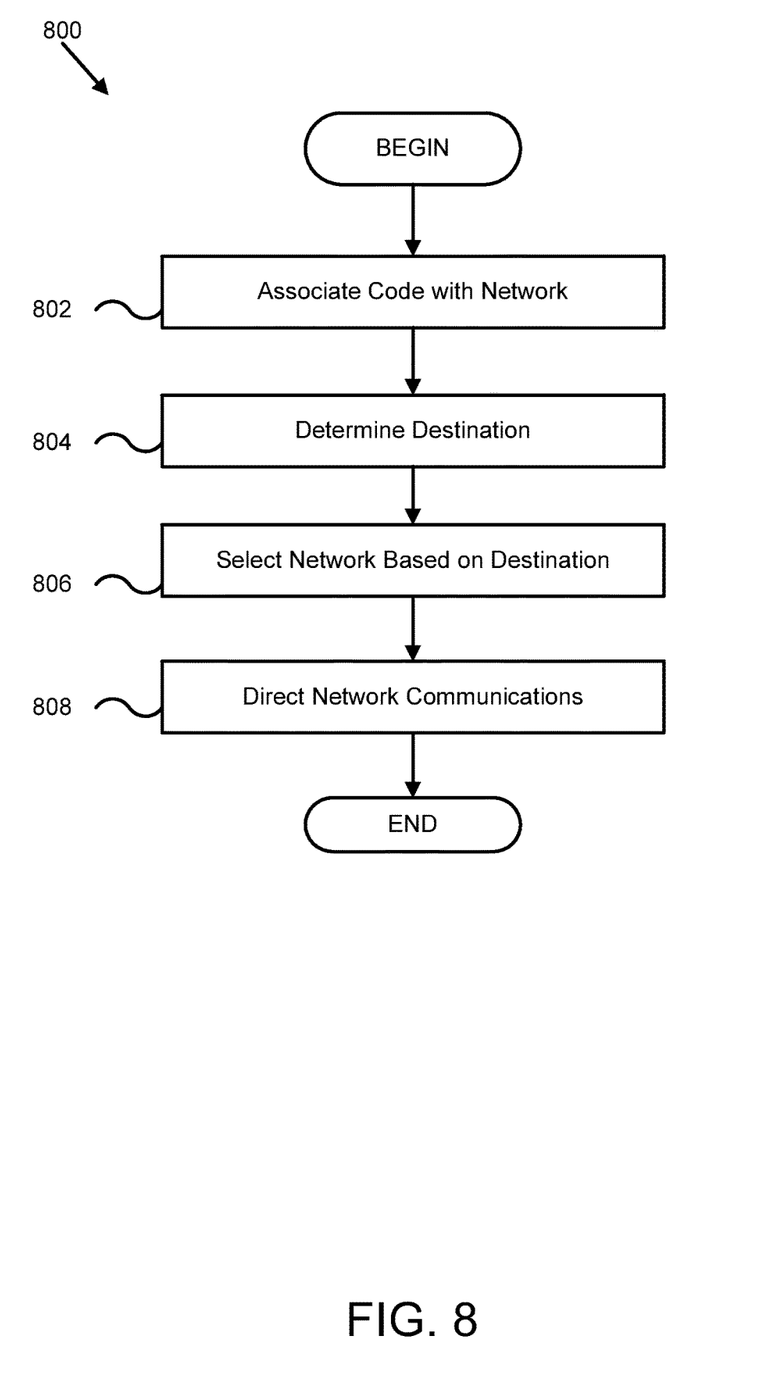
FIG. 8 is a schematic flow chart diagram illustrating one embodiment of a method for selecting a network.

FIG. 8 is a schematic flow chart diagram illustrating one embodiment of a method for selecting a network. In one embodiment, the method may begin and the association module 120 may associate 802 executable code with one or more network interfaces. The selection module 140 may determine 804 a destination of network communications originating at the portion of executable code. The selection module 140 may select one of the network interfaces based on the determined destination. The direction module 160 may direct 808 the network communication to the selected network interface and the method may end.

In another embodiment, the selecting may be based on an indication from the executable code. For example, an executing application may request use of one or more available interfaces and the selection module 140 may accordingly select the indicated network interface. In another embodiment, the indication may originate at a user of the apparatus.

In another embodiment, the method may include prioritizing associated network interfaces. The selection module 140 may select an available network interface based on the priority values.

Figure 9:
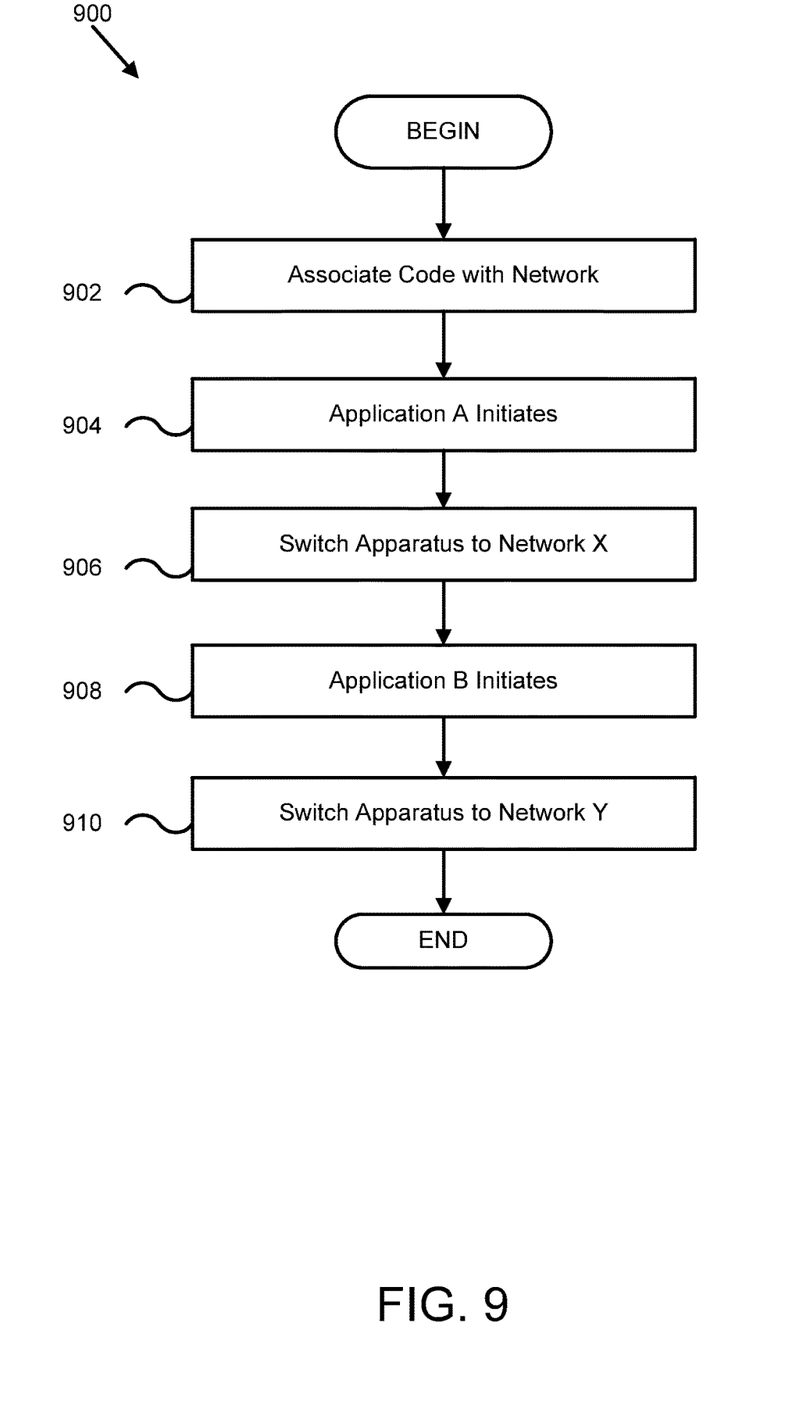
FIG. 9 is a schematic flow chart diagram illustrating one embodiment of a method for selecting a network.

FIG. 9 is a schematic flow chart diagram illustrating one embodiment of a method for selecting a network. In one embodiment, the method 900 may begin and the association module 120 may associate one or more network interfaces with executable code. The apparatus 100 may initiate 904 Application A. In response to the Application A being initiated, the selection module 140 may switch a network connection for the apparatus to Network X (a network interface associated with Application A). Thereafter, the apparatus may initiate 908 Application B. In response to the Application B being initiated, the selection module 140 may switch a network connection for the apparatus to Network Y (a network interface associated with Application B) and the method may end.

Therefore, in certain embodiments, the selection module 140 may select a network interface responsive to code being initiated at the apparatus 100. In another embodiment, the selection module 140 may select a network interface responsive to code take focus of a display for the apparatus 100. For example, in response to a user switch a display from one application to another, the selection module 140 may also switch a network connection to one that may be associated with the application the user switched to.

Figure 10:
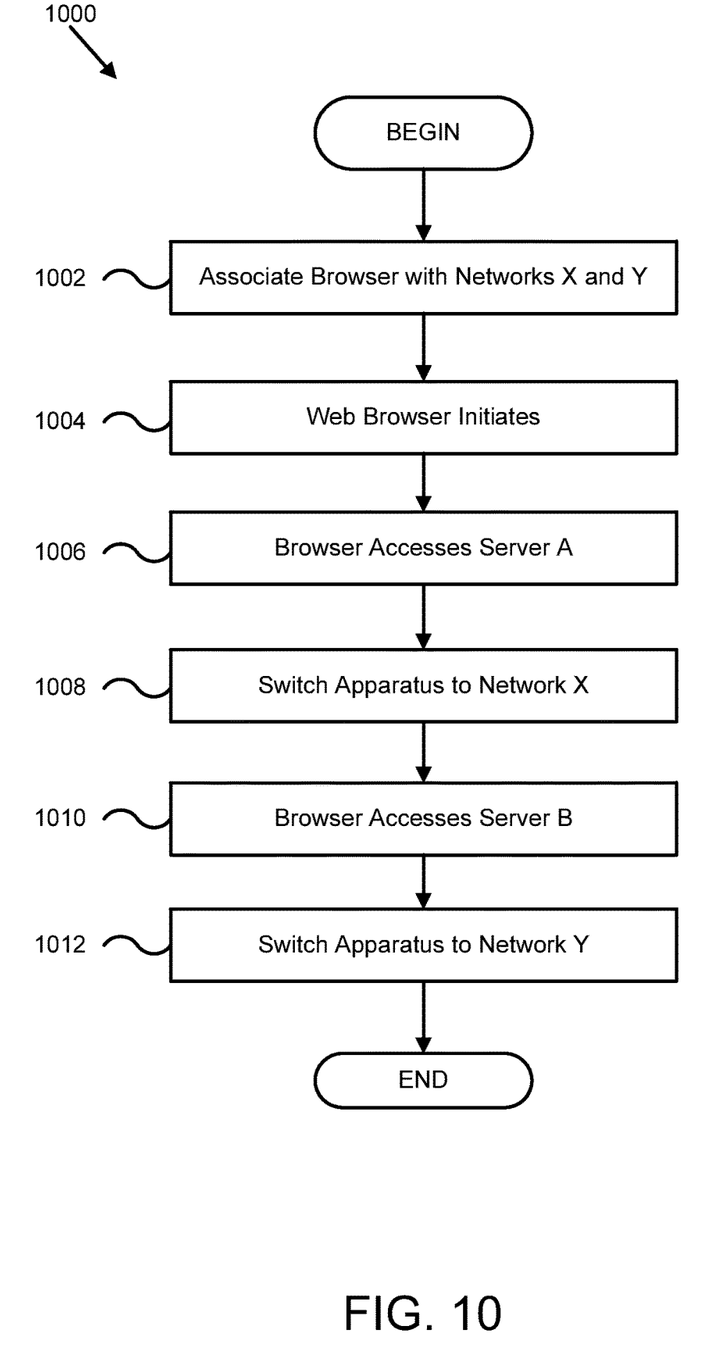
FIG. 10 is a schematic flow chart diagram illustrating one embodiment of a method for selecting a network.

FIG. 10 is a schematic flow chart diagram illustrating one embodiment of a method for selecting a network. In one embodiment 1000 the method may begin and the association module 120 may associate 1002 a web browser with two network interfaces: network X and network Y. The apparatus 100 may initialize 1004 the browser application. The browser application, or other executable code, may access 1006 server A. Responsive to the network communication being directed to server A, the selection module 140 may switch 1008 a network connection for the apparatus 100 to network X. Thereafter, the browser application may access 1010 server B and the selection module 140 may switch 1012 a network connection for the apparatus 100 to network Y. As described herein, the direction module 160 may direct the network communications to the selected server.

In one embodiment, the selection module 140 may switch based on an indication from the browser application. In another embodiment, the selection module 140 may switch by modifying a network driver for the apparatus, the switch based on a destination address for the communications between the apparatus 100 and server A or server B.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a display accessible by the processor; and
a memory that stores machine instructions executable by the processor, the instructions comprising:
code that associates executable code with a plurality of network interfaces, wherein the executable code comprises a first application and a second application;
code that assigns, within the first application and the second application, a priority value to each network interface of the plurality of network interfaces associated with the executable code;
code that switches from a first network interface of the plurality of network interfaces to a second network interface of the plurality of network interfaces responsive to detecting network communication originating at the first application, wherein the second network interface is selected based on the priority value corresponding to the second network interface; and
code that directs the network communication corresponding to the first application to the second network interface and concurrently directs network communication corresponding to the second application to the first network interface, wherein the first network interface is more secure than the second network interface, only a specified secure network interface is used by the second application, and the first network interface is the specified secure network interface.

2. The apparatus of claim 1, wherein switching to the second network interface is further based on an indication from the executable code.

3. The apparatus of claim 1, wherein the code that switches to the second network interface further switches based on a destination device of the network communication.

4. The apparatus of claim 1, wherein the code that associates the executable code associates further based on an indicator from a user.

5. The apparatus of claim 1, wherein the executable code is selected from the group consisting of an application, an operating system, a driver, and a library.

6. The apparatus of claim 1, wherein the executable code is included in a category, the plurality of network interfaces associated with the category.

7. A method comprising:
associating executable code with a plurality of network interfaces, wherein the executable code comprises a first application and a second application;
assigning, within the first application and the second application, a priority value to each network interface of the plurality of network interfaces associated with the executable code;
switching from a first network interface of the plurality of network interfaces to a second network interface of the plurality of network interfaces responsive to detecting network communication originating at the first application, wherein the second network interface is selected based on the priority value corresponding to the second network interface; and
directing the network communication corresponding to the first application to the second network interface and concurrently directing network communication corresponding to the second application to the first network interface, wherein the first network interface is more secure than the second network interface, only a specified secure network interface is used by the second application, and the first network interface is the specified secure network interface.

8. The method of claim 7, wherein switching to the second network interface is further based on an indication from the executable code.

9. The method of claim 7, wherein switching to the second network interface is further based on a destination device of the network communication.

10. The method of claim 7, wherein the associating is based on an indicator from a user.

11. The method of claim 7, wherein the executable code is selected from the group consisting of an application, an operating system, a driver, and a library.

12. The method of claim 7, wherein the executable code is included in a category, the associating the executable code with the plurality of network interfaces associating by associating the executable code with the category.

13. A program product comprising a non-transitory computer readable storage medium that stores code executable by a processor, the executable code comprising code to perform:
associating executable code with a plurality of network interfaces, wherein the executable code comprises a first application and a second application;
assigning, within the first application and the second application, a priority value to each network interface of the plurality of network interfaces associated with the executable code;
switching from a first network interface of the plurality of network interfaces to a second network interface of the plurality of network interfaces responsive to detecting network communication originating at the first application, wherein the second network interface is selected based on the priority value corresponding to the second network interface; and
directing the network communication corresponding to the first application to the second network interface and concurrently directing network communication corresponding to the second application to the first network interface, wherein the first network interface is more secure than the second network interface, only a specified secure network interface is used by the second application, and the first network interface is the specified secure network interface.

14. The program product of claim 13, wherein switching to the second network interface is further based on an indication from the executable code.

15. The program product of claim 13, wherein switching to the second network interface is further based on a destination device of the network communication.

16. The program product of claim 13, wherein the associating is based on an indicator from a user.

17. The program product of claim 13, wherein the executable code is selected from the group consisting of an application, an operating system, a driver, and a library.

* * * * *